Figure 1:
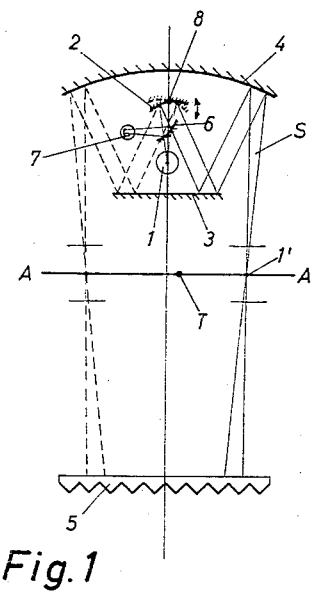

Feb. 14, 1961 — E. SICK — 2,971,695
PHOTOELECTRIC APPARATUS
Filed Dec. 23, 1958 — 4 Sheets-Sheet 1

Feb. 14, 1961     E. SICK     2,971,695

PHOTOELECTRIC APPARATUS

Filed Dec. 23, 1958     4 Sheets-Sheet 2

United States Patent Office 2,971,695
Patented Feb. 14, 1961

2,971,695
PHOTOELECTRIC APPARATUS

Erwin Sick, 7–9 An der Alle, Waldkirch, Breisgau, Germany

Filed Dec. 23, 1958, Ser. No. 782,578

Claims priority, application Germany Dec. 23, 1957

15 Claims. (Cl. 235—92)

This invention relates to an apparatus for the photoelectric scanning of material passing therethrough. More particularly, the invention is concerned with the problem of the photoelectric counting of small and miniature objects.

Up to now it has been common practice for the purpose of photoelectric counting to use static light barriers which are interrupted by the objects passing therethrough and thereby generate an impulse which may be stored in a mechanical or electric register or may be utilized to release a control operation. If very small parts such as jewels for watches, for instance, which have sizes of only some tenths of a millimeter, considerable difficulties have been encountered in practical operation. As a matter of fact, there is the difficulty that a very small change of intensity only and thus so weak an impulse is obtained upon the passage of the objects to be counted if the beam of radiation of the light barrier is given a substantially greater width as compared with that of the objects to be counted, so that no proper counting is possible. If, however, a very sharp beam is used that has a width which corresponds approximately to the size of the parts to be counted, these parts must be passed through the light beam with an accuracy in alignment that allows only deviations of the order of a fraction of a millimeter. With any lateral deviation from the predetermined course, the part to be counted will pass by the light barrier in a more or less laterally displaced course, so that the light barrier fails to generate an impulse or, according to the magnitude of lateral deviation, supplies more or less intense impulses. But such an accurate guide of miniature parts can hardly be achieved in practice, so that also in this case counting errors cannot be avoided.

Similar problems are to be faced with conventional apparatus of this kind when annular parts, parts with extensions (condensers, for instance) or parts with irregular shape (wrapped sweets, for instance) have to be counted, because double counting may occur if sharp beams are employed.

In order to obtain with well known static light barriers results which are at least utilizable, it is thus necessary in each individual case to adapt the width of the beam of radiation to the size of the parts to be counted. In many cases of application, however conventional apparatus of this kind fail completely.

It is therefore the primary object of the present invention to provide a light barrier which may be universally used which, without such an adaption of the beam width to the size of objects, permits the counting of parts the sizes of which may vary in wide limits, and which supplies well reproducible counting impulses.

It is a further object of the invention, even with parts of smallest size to dispense with the necessity of an accurate guidance of such parts.

Further objects of the invention will no doubt appear to those skilled in the art from the following detailed description.

According to the invention a light curtain is employed with which a beam of light is oscillated into a plane through a movable mirror and directed to impinge upon a photoelectric cell or the like. This light curtain is arranged vertically with respect to the direction of passage of the material to be counted.

It is possible with such curtain type light barriers to provide a very sharp beam of light, so that the photoelectric cell or the like supplies a satisfactory impulse, even in the event parts of smallest size are passed through the light barrier. On the other hand, however, all parts passing through are detected, even if they should fail exactly to follow a pre-determined course of passage through the light barrier.

Light curtains supply an impulse in a manner which is known per se as soon as a part to be counted or detected reaches the control plane and interrupts the light beam at any point during an oscillating movement performed by it. This impulse so generated is maintained over the entire duration the part to be detected remains in the control plane where it is immaterial whether the beam is interrupted once or twice—with a ring shaped object, for instance—during each period. In this manner any double counting is effectively avoided.

Three preferred embodiments of the invention are more fully described in the following merely for the purpose of explanation and not in a limiting sense. Figs. 1 to 5 shows first of all schematically the principle of the apparatus conceived and constructed according to the present invention by way of several types of construction. Figs. 6 to 9 show in detail the structural setup of the embodiment according to Figs. 3 and 4.

Figure 3:
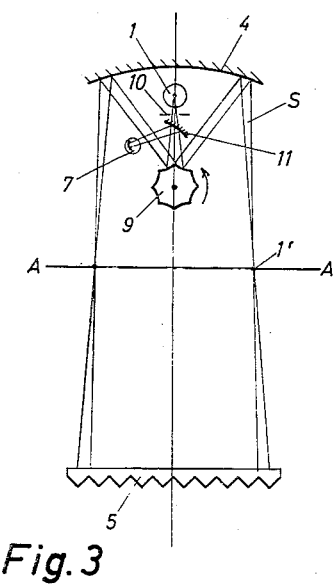
Figure 2:
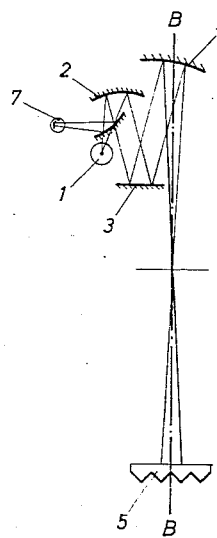
Figure 5:
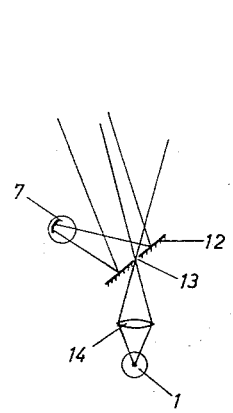
Figure 4:
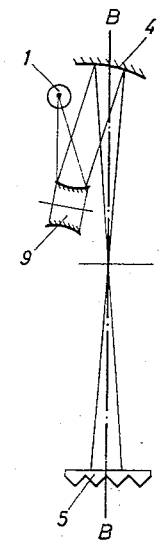
Figure 6:
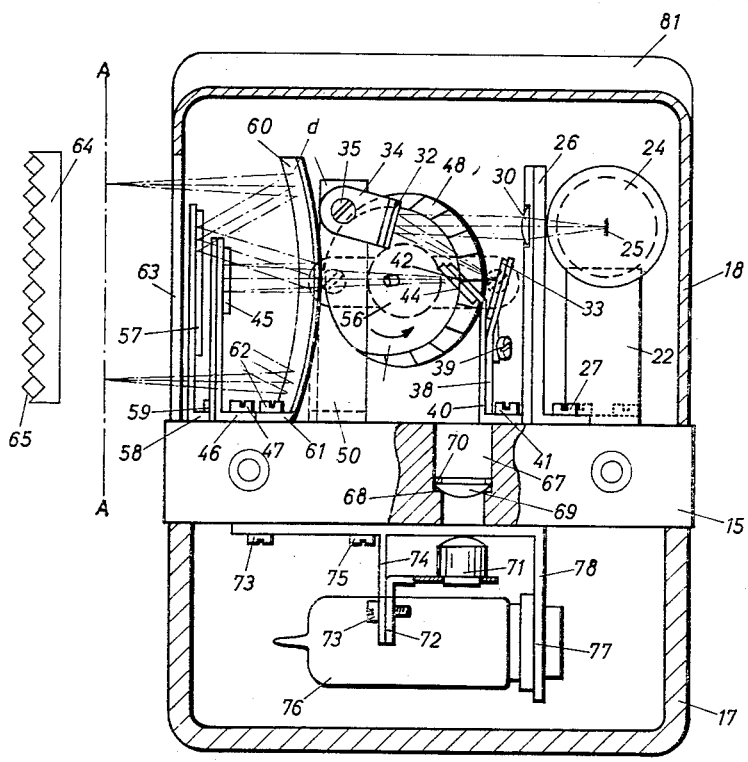
Figure 8:
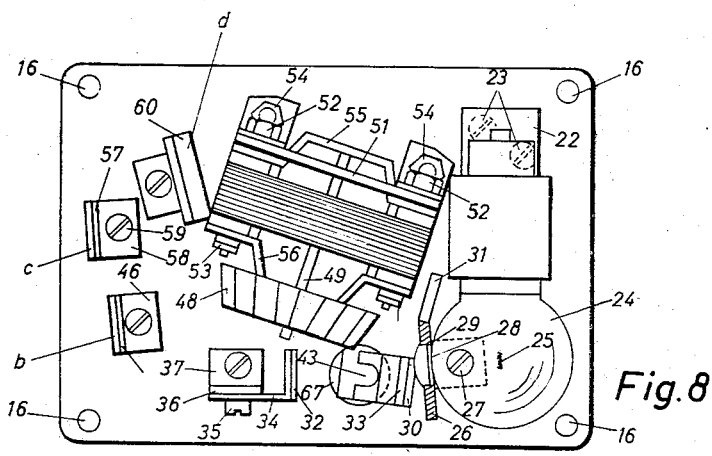
Figure 7:
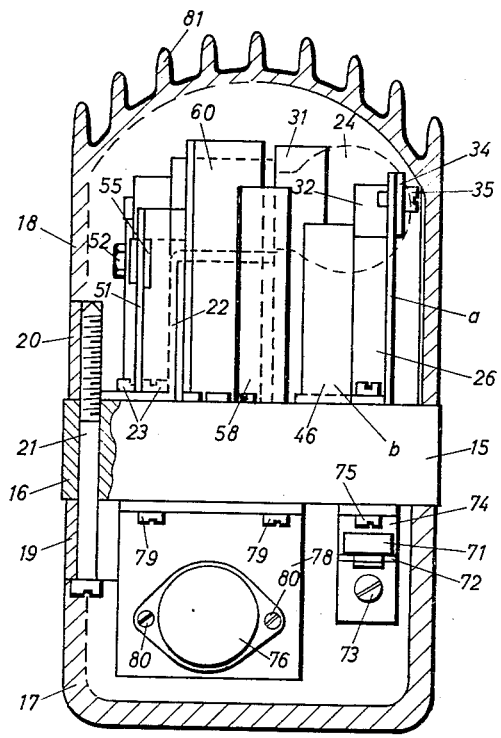
Figure 9:
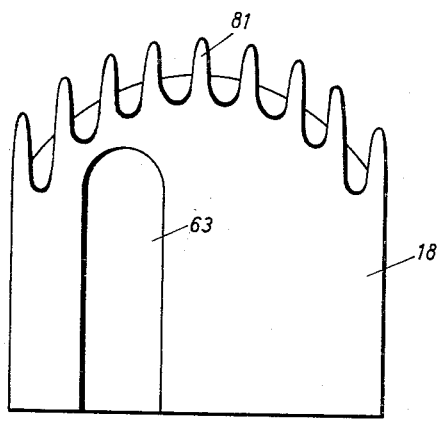
Figure 11:
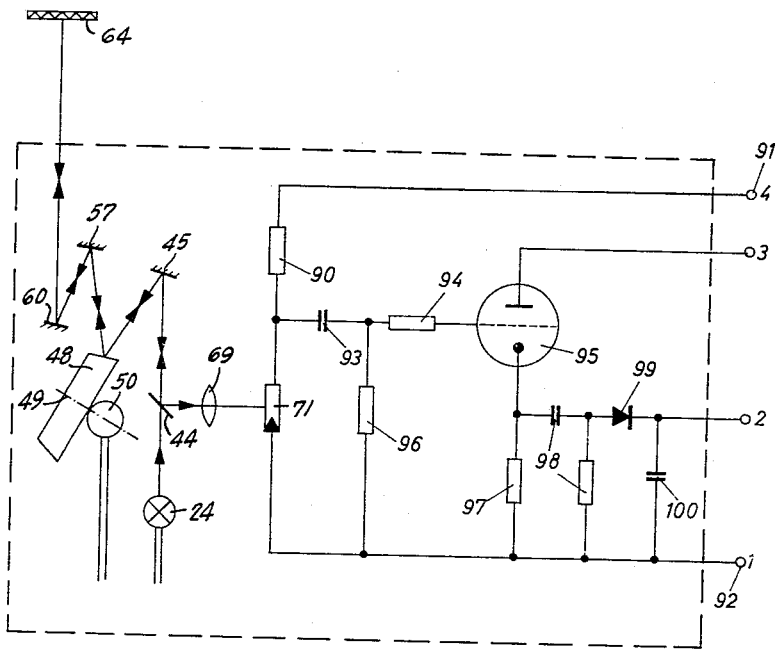
Figure 10:
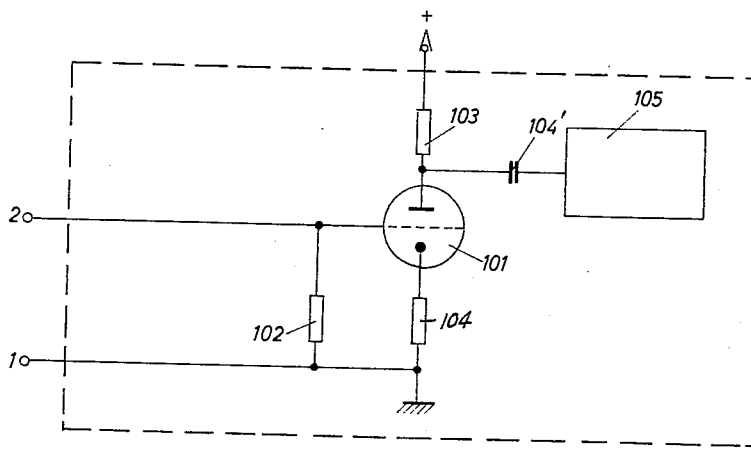

In the drawings:

Fig. 1 shows schematically a photoelectric scanning apparatus according to the invention as viewed in the direction of passage of the material to be counted, Fig. 2 is a side elevation of the apparatus shown in Fig. 1, Fig. 3 shows another embodiment of the invention in a schematic representation similar to that of Fig. 1, Fig. 4 is a side elevation of Fig. 3, Fig. 5 shows a structural modification, Fig. 6 shows an apparatus according to the invention in side elevation and partially sectional view, Fig. 7 is a front view of the arrangement according to Fig. 6 in partial sectional representation, Fig. 8 is the plan view of the arrangement according to Fig. 6, Fig. 9 shows the front of the upper part of the casing, Fig. 10 shows a portion of the circuit arrangement, and Fig. 11 shows the remainder of the circuit arrangement.

In Figs. 1 and 3 it should be imagine that the material to be scanned moves vertically to the plane of the paper from the front to the rear in a plane A—A. It should be assumed in the following that it is the matter of very small parts T which are to be counted. The arrangement shown schematically is so designed that a counting impulse is supplied as soon as a part T passes a control plane B—B which is vertical to the plane effecting the movement of part T. A light curtain is provided in the plane B—B.

In the embodiment according to Fig. 1, a beam of radiation S is emitted by a source of light 1 and passed via an oscillating mirror 2 and a plane mirror 3 to impinge upon parabolic mirror 4. The beam of radiation is limited by the size of the oscillating mirror 2. The focal point of the parabolic mirror 4 substantially coincides with the image of the oscillating mirror 2 reflected in the plane mirror 3.

A real image 1' of the source of light 1 is produced in the plane of movement A—A of the material passing through. The rays diverging from there impinge upon a reflector strip 5 which consists of a plurality of triple reflectors and which reflects the rays practically exactly in themselves. The reflected light is again directed to pass via mirrors 4, 3 and 2 and reaches a photodiode 7 after having passed a semi-transparent mirror 6 which is inclined at an angle of 45 degrees with respect to the ray path and is arranged between the source of light 1 and the oscillating mirror 2. Mirror 2 rotates in the plane of the paper rapidly about the axis 8. The beam of radiation S is thereby caused to move parallel to itself to and fro thereby covering the entire width of the mirror 4 and thus scans continuously the entire control plane B—B. As soon as a part T passes within the plane A—A through the control plane B—B, the photodiode supplies an intense impulse upon each oscillation of the light beam, no matter at which point part T passes through the plane A—A. A circuit arrangement known per se with press safety devices then supplies a counting impulse which lasts as long as part T remains in the control plane B—B, so that irrespective of the shape of the part to be counted, each part T supplies only one single counting impulse whereby double counting is avoided.

In the embodiment according to Figs. 3 and 4, the light curtain is generated by means of a rotating polygonal mirror 9 which reflects the beam of radiation S emitted from the source of light 1 to impinge upon the parabolic mirror 4. The polygonal mirror 9 is arranged close to the focal point of the parabolic mirror 4. In this arrangement, the beam is restricted by a diaphragm 10.

The polygonal mirror 9 is composed of concave mirrors which focus the beam of radiation S in the plane A—A. The beam S is then reflected in itself by the triple reflectors 5 and is directed via the mirror 4, the polygonal mirror 9 and a semi-transparent concave mirror 11 to impinge upon the photodiode 7.

The operation of this arrangement is similar to that of the first embodiment with the exception, however, that the beam of radiation does not oscillate in the plane B—B but, as will be readily appreciated, constantly scans the control plane in one direction.

Instead of the semi-transparent mirrors 6, 11, which give cause to an undesirable loss of light, an arrangement as shown in Fig. 5 may also be provided to deflect the beam S to the photodiode 7. In this arrangement, a normal mirror 12, which is provided with a small hole, is used in place of the mirrors 6, 11, and a real image of the source of light 1 is formed on this hole 13 by means of a condenser lens 14.

In practice, it is advisable for the counting of small parts to provide light curtains which have a height of approx. 5 mm. A second type of apparatus according to the invention may comprise a light curtain with a height of approx. 20 mm. With these two types, practically all counting problems met with in this scope can be mastered. The frequency of the light beam may range from 500 to 1000 cycles per second.

Referring now to Figs. 6 to 9 which show the structural setup of a light-electric scanning device according to Figs. 3 and 4. Numeral 15 designates a rectangular base plate which has bore holes 16 (Figs. 7 and 8) at its four corners. One casing part 17, 18 (Figs. 6 and 7) is screwed up with each of both sides of the base plate 15. Ears 19 are for this purpose provided on the four corners of the casing part 17 and similar ears 20 (Fig. 7), which are fitted with internal threads, are provided on the casing part 18. Screw bolts 21 are passed through the ears 19 and the holes 16 and screwed into the internal thread of the ears 20 and in this manner connect securely the two casing parts 17, 18 and the base plate 15. A Z-shaped sheet metal bracket 22 (Figs. 7 and 8) is screwed to the base plate 15 by means of screws 23. The sheet metal bracket 22 supports an incandescent lamp 24 having a filament 25 which serves as a nearly pointed source of light. Aside of the incandescent lamp 24 is another sheet metal bracket attached to the base plate by means of a screw 27. This latter sheet metal bracket 26 has a recess 28 with a shoulder 29 into which is inserted a lens 30 which may be done by cementing, for instance (Figs. 6 and 8). A marginal portion 31 of the sheet metal bracket 26 is bent to form an angle with the rest of the bracket and has the function of preventing direct light of the incandescent lamp 24 to fall upon the rest of the optical elements. The light emitted by the incandescent lamp filament 25 is bundled by the lens 30 and through a mirror 32 collected on a mirror 33 (Fig. 6). The mirror 32 is mounted on an L-shaped sheet metal part 34 which is fastened to an angular piece 36 by means of a screw 35. The angular piece 36 is connected with the base plate 15 by means of a screw 37. The position of the sheet metal part 34 and the mirror 33 may be adjusted by releasing and retightening the screw 35. The mirror 33 is attached to a sheet metal part 38 which is bent into a slightly angular position and which is connected with a sheet metal angular part 40 by means of a screw 39, the angular part 40 being also attached to the base plate 15 by means of a screw 41. The mirror 33 is arranged in a position which is slightly rotated about a vertical axis then compared with the mirror 32. The angular piece 40 has bent end 42, which is bent away from the mirror 33, so that the end 42 forms a V together with the mirror 33 and has a U-shaped recess 43 (Fig. 8). On the lower side of the end 42 which does not face the mirror 33 is mounted a semi-transparent mirror 44 (Figs. 6 and 8) which is preferably cemented to this latter end 42, and which has a function that will be described in detail hereinbelow.

A beam of radiation is reflected by the mirror 33 to a mirror 45 passing on its course through the recess 43 and through the semi-transparent mirror 44. The mirror 45 is mounted on a sheet metal bracket 46 which latter bracket is fixed on the base plate by means of a screw 47. The mirror 45 directs the beam of radiation to hit a polygonal mirror 48. The polygonal mirror 48 has a truncated pyramid shape and is mounted on a shaft 49 which is driven by a small electric motor 50 (Figs. 7 and 8). The electric motor 50 is attached to a stamped metal part 51 by means of screws 52 and nuts 53. The stamped metal part 51 is fixed to the base plate 15 by means of screws 54. The screws 52 and nuts 53 have also the function of fixing two brackets 55, 56 which support the shaft 49.

The polygonal mirror 48 reflects the beam of radiation to an oblong mirror 57 which is mounted on an angular piece 58 and which latter angular piece is held in position by a screw 59. From the mirror 57, the beam of radiation is directed to impinge upon a parabolic cylinder-mirror 60 which is supported by a holder 61. The holder 61 is fixed at the base plate 15 by means of a screw 62.

From the parabolic cylinder-mirror 60 is the beam of radiation directed to pass through an oblong recess 63 of the casing part 18 (Figs. 6 and 9) towards the outside.

Opposite the recess 63 is arranged a reflector 64 (Fig. 6) which is composed of a plurality of triple reflectors and which, as is well known, has the property of reflecting all light rays impinging upon it in parallel to themselves. The reflector 64 is advantageously manufactured as a die casting made of plastic material, the individual triple reflectors being formed of totally reflecting surfaces of small pyramids 65 on the back of the reflector 65. In view of the purposes contemplated by the present invention, it is necessary that the reflector 64 is manufactured with great accuracy.

The arrangement described is so conceived and constructed that the beam of radiation is focused in a plane A—A by means of the mirror 60 (Figs. 3 and 6), i.e., that a real image of the mirror 33 is formed in the plane A—A by the parabolic mirror 60. If deemed necessary, the sides of the polygonal mirror 48 also may be designed as concave mirrors in order to achieve the above mentioned result and as illustrated schematically in Figs. 3 and 4. The point in which the beam of radiation hits the polygonal mirror 48 lies in the focal line of the parabolic cylinder-mirror 60. Of now the polygonal mirror 48 rotates in the direction of the arrow 66 (Fig. 6), the beam of radiation moves parallelly to itself periodically from top to bottom (Fig. 6) and thereby scan constantly the plane A—A.

The light reflected by the reflector 64 is returned on the same way via the mirrors 60, 57, 48, 45 to the semi-transparent mirror 44 and is laterally deflected by the latter semi-transparent mirror.

The base plate 15 has a hole 67 fitted with a shoulder 68 (Fig. 6) on which rests a lens 69 which is held in position by a circlip 70. The lens 69 collects the laterally deflected beam of radiation on a light-electric detector 71. In the embodiment represented, a photodiode is used as detector which has proven to be especially advantageous for these purposes. The photodiode is mounted on a sheet metal bracket 72 which is connected with a second sheet metal bracket 74 by means of a screw 73. The bracket 74 is screwed up with the lower side of the base plate (Figs. 6 and 7) by means of the screw 75.

The casing part 17 further comprises the electric switch elements which are arranged in the scanning head. An amplifier tube 76 is supported with its base 77 by an angular piece 78 which is attached to the base plate by means of screws 79. The amplifier tube base 77 is fixed in common manner at the angular piece 78 by means of two screws 80.

The upper casing part 18 is provided with cooling fins 81 (Figs. 6, 7 and 9).

A rather compact structural setup of the scanning head is obtained by the repeated deviation of the ray path through the mirrors 32, 33, 45 and 57. It is thus possible to give the scanning head a relative small size. A simple possibility of adjusting conveniently the ray path is given by it that the mirrors are attached to sheet metal brackets or angular pieces which are fixed on the base plate by means of screws.

In the foregoing, embodiments of the invention have been described in detail. It will be readily appreciated that the invention can, of course, also be realized in various other ways, and those who are skilled in the art will no doubt be able, after having received the teaching of the specification present, without any inventive performance to find other structural solutions without deviating from the basic idea and the scope of the invention. It is therefore emphasized that the details described are only intended to have an explanatory character without limiting in any way the scope of protection of the patent as defined in the following claims.

Referring now to Figs. 10 and 11 of the drawings, there is shown a simplified representation of the electric circuit arrangement. The photodiode 71 is connected in series together with a resistor 90 to a voltage source (not represented) which is closed at 91 and 92. The resistance of the photodiode varies as a function of the radiation impinging thereon. As long as there is no element T in the plane B—B, the luminous intensity on the photodiode and thus also the resistance of the photodiode is constant. If, however, an element to be counted enters the range of the oscillating beam of radiation, i.e., the element reaches the plane B—B, a dark impulse is produced on the photodiode upon each passage of the beam of radiation. This dark impulse gives cause to a corresponding variation of the resistance of the photodiode whereby an alternating current impulse is generated between the photodiode and the resistor 90 which actually form a voltage divider. This alternating current impulse is supplied through a coupling transformer 93 and a resistor 94 to the grid of an amplifying tube 95. Numeral 96 designates the grid lead of the tube 95. The tube 95 is connected to operate as a cathode amplifier. Numeral 97 designates the cathode resistance on which are tapped impulses. The impulses so obtained are rectified through an R.C. member 98 and by means of a peak rectifier 99. The impulses so rectified are then smoothened by means of a condenser 100, so that a direct current voltage is obtained. It must be taken into account that the impulses follow each other in a timed sequence of the order of milliseconds. This time sequence of the impulses depends on the speed of the motor and the number of the mirror surfaces of the polygonal mirror.

The direct current voltage is applied to the grid of a tube 101 having a grid lead 102, an anode resistance 103 and a cathode resistance 104. As soon as such a direct current is produced, the tube 101 is blocked. An electric current flows as soon as no voltage is impressed on the grid of the tube. The anode of the tube 101 thus changes its potential which depends on it whether an element T is in the plane B—B or not. These voltage variations are fed through a coupling condenser 104' to and counted by an electric or mechanical counting device 105 which is known per se.

I claim:

1. An apparatus for the counting of elements passing therethrough comprising a source of light, means to produce a narrow beam of light and means to focus said beam of light in a first plane, means to oscillate said beam of light on a second plane, guide means arranged to guide the elements in said first plane and through said second plane, photoelectric means and means to direct said oscillating beam of light to impinge upon said photoelectric means, counting means electrically connected with said photoelectric means to count the elements passing therethrough.

2. An apparatus for the counting of elements passing therethrough comprising a source of light, means to produce a narrow beam of light and means to focus said beam of light in a first plane, means to oscillate said beam of light in a second plane comprising a polygonal mirror, drive means connected with said polygonal mirror to drive said mirror, means to direct the beam of light to impinge upon the polygonal mirror, photoelectric means and means to direct the beam of light to impinge upon said photoelectric means, counting means electrically connected with said photoelectric means to count the elements passing through.

3. An apparatus for the counting of elements passing therethrough comprising a source of light, means to produce a narrow beam of light and means to focus said beam of light in a first plane, means to oscillate said beam of light in a second plane comprising a polygonal mirror, drive means connected with said polygonal mirror to drive said mirror, means to direct the beam of light to impinge upon the polygonal mirror, photoelectric means and means to direct the beam of light to impinge upon said photoelectric means, electric means having a first and a second circuit condition, said electric means electrically connected with said photoelectric means to be brought into the first circuit condition as soon as and as long as the photoelectric means supply alternating current impulses, and to be brought into the second circuit conditions as soon as and as long as the photoelectric means supply no alternating current impulses, and counting means to count the changes between the first and the second circuit condition.

4. An apparatus for the counting of elements passing therethrough comprising a source of light, means to produce a narrow beam of light and means to focus said beam of light in a first plane, means to oscillate said beam of light in a second plane, guide means arranged to guide the elements in said first plane and through said second plane, electric means having a first and a second circuit condition, said electric means electrically connected with said photoelectric means to be brought into the first circuit condition as soon as and as long as the photoelectric means supply alternating current impulses, and to be brought into the second circuit condition as soon as and as long as the photoelectric means supply no alternating current impulses, and counting means to count the changes between the first and the second circuit condition.

5. An apparatus according to claim 2 characterized in that the polygonal mirror is formed by concave mirrors.

6. An apparatus for the counting of elements passing therethrough comprising a source of light, means to produce a narrow beam of light and means to focus said beam of light in a first plane, means to oscillate said beam of light in a second plane comprising a rotating mirror, operatively connected to the rotating mirror to oscillate said mirror, means to direct the beam of light to impinge upon the polygonal mirror, photoelectric means and means to direct the beam of light to impinge upon said photoelectric means, counting means electrically connected with said photoelectric means to count the elements passing through.

7. An apparatus for the counting of elements passing therethrough comprising a source of light, means to produce a narrow beam of light and means to focus said beam of light in a first plane, means to oscillate said beam of light in a second plane comprising a rotating mirror, operatively connected to the rotating mirror to oscillate said mirror, means to direct the beam of light to impinge upon the polygonal mirror, photoelectric means and means to direct the beam of light to impinge upon said photoelectric means, electric means having a first and a second circuit condition, said electric means electrically connected with said photoelectric means to be brought into the first circuit condition as soon as and as long as the photoelectric means supply alternating current impulses, and to be brought into the second circuit condition as soon as and as long as the photoelectric means supply no alternating current impulses, and counting means to count the changes between the first and the second circuit condition.

8. An apparatus according to claim 6, characterized in that the rotating mirror has concave curvature.

9. An apparatus according to claim 1 and further comprising a parabolic cylinder-mirror, said oscillating means substantially arranged in the focal plane of said parabolic cylinder-mirror.

10. An apparatus according to claim 1 and further comprising a parabolic cylinder-mirror, said oscillating means substantially arranged in the focal plane of this parabolic cylinder-mirror, and reflecting means arranged opposite the parabolic cylinder-mirror and adapted to reflect all incident light substantially in itself.

11. A method for counting objects which comprises moving said objects along a first plane, rapidly sweeping a narrow beam of light in a second plane which intersects said first plane at a line crossing the path of movement of said objects while maintaining said beam focused at all points in said first plane along the line of intersection of said beam with said plane, and detecting by photoelectric means the number of periods of beam interception caused thereby.

12. An apparatus for the counting of elements passing therethrough comprising a source of light, means to produce a narrow beam of light and means to focus said beam of light in a plane, a polygonal mirror, drive means connected with said polygonal mirror to drive said mirror, means to direct the beam of light to impinge upon the polygonal mirror, photoelectric means and means to direct the beam of light to impinge upon said photoelectric means, electric means having a first and a second circuit condition, said electric means electrically connected with said photoelectric means to be brought into the first circuit condition as soon as and as long as the photoelectric means supply alternating current impulses, and to be brought into the second circuit condition as soon as and as long as the photoelectric means supply no alternating current impulses, and counting means to count the changes between the first and the second circuit condition.

13. An apparatus for the counting of elements passing therethrough comprising a source of light, means to produce a narrow beam of light and means to focus said beam of light in a plane, a rotating polygonal mirror, means operatively connected to the rotating mirror to oscillate said mirror, means to direct the beam of light to impinge upon the polygonal mirror, photoelectric means and means to direct the beam of light to impinge upon said photoelectric means, electric means having a first and a second circuit condition, said electric means electrically connected with said photoelectric means to be brought into the first circuit condition as soon as and as long as the photoelectric means supply alternating current impulses, and to be brought into the second circuit condition as soon as and as long as the photoelectric means supply no alternating current impulses, and counting means to count the changes between the first and the second circuit condition.

14. An apparatus for scanning a carrier moving in relation to said apparatus for detecting light contrasts at the surface of said carrier which comprises a source of light, means to produce a narrow beam of light and means to focus said beam of light in a first plane, means to oscillate said beam of light on a second plane, guide means for guiding said carrier in said first plane and through said second plane, photoelectric means and means to direct said oscillating beam of light to impinge upon said photoelectric means, and means electrically connected with said photoelectric means to register light contrasts at the surface of said carrier passing therethrough.

15. An apparatus according to claim 14 wherein said means to focus said beam of light in a first plane comprises a parabolic cylinder-mirror, said oscillating means substantially arranged in the focal plane of said parabolic cylinder-mirror.

References Cited in the file of this patent

UNITED STATES PATENTS

| 2,561,406 | Odquist | July 24, 1951 |
| 2,719,235 | Emerson | Sept. 27, 1955 |